Feb. 8, 1949.  K. EFTIHIOS  2,461,375
FOOD REFRIGERATING APPARATUS
Filed April 4, 1947  2 Sheets-Sheet 1

Inventor,
Kosmas Eftihios
By Ivan P. Tashof,
ATTORNEY

Feb. 8, 1949. K. EFTIHIOS 2,461,375
FOOD REFRIGERATING APPARATUS
Filed April 4, 1947 2 Sheets-Sheet 2
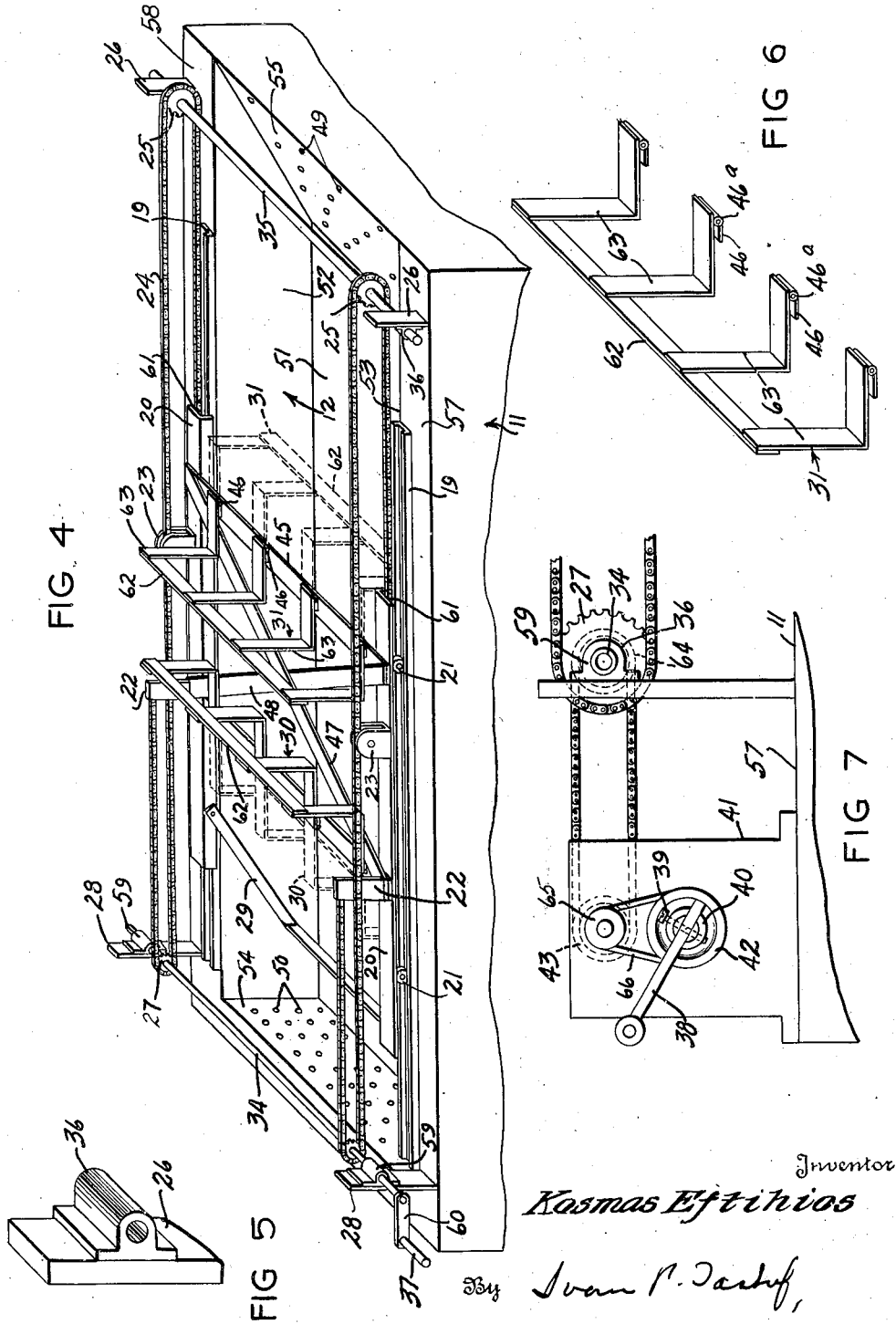
Inventor,
Kosmas Eftihios
By Ivan P. Tashof,
ATTORNEY Patented Feb. 8, 1949

2,461,375

UNITED STATES PATENT OFFICE 2,461,375

FOOD REFRIGERATING APPARATUS

Kosmas Eftihios, New Orleans, La.

Application April 4, 1947, Serial No. 739,328

15 Claims. (Cl. 62—104)

This invention pertains to a new and useful device for freezing various food products, and more particularly to apparatus used in freezing ice cream, custards and other food products which are liquids at ordinary temperatures, and which when brought to temperatures below 32 degrees Fahrenheit, or thereabout, are changed into a solid, semi-solid or plastic state.

Liquid food compositions of the kind referred to are customarily poured into a battery of metallic receptacles, usually in blocks of 12 or multiples thereof. Such receptacles are commonly formed by deep drawing from metal plates and are supported upon a suitable carrier from, or rest upon the base of a trough carrying the refrigerating fluid.

Prior to the development of the hereinafter described invention the filled receptacles or food molds were pushed through a refrigerating brine manually by means of a wooden hoe-like implement, which frequently resulted in splashing or spilling of the brine into the receptacles thus destroying the value of the food therein.

The present invention has for its chief object the provision of food freezing apparatus having means for propelling filled food receptacles or molds through a liquid refrigerant at a uniform rate to accomplish freezing of the food without danger of contaminating the same by splashing or spilling of the refrigerant.

A further object of the invention is to provide food freezing apparatus having means whereby food containers can be loaded into the refrigerating mechanism, propelled through the refrigerant and removed therefrom by a continuous operation with a minimum of effort on the part of the operator.

A still further object is the provision of food freezing apparatus of compact unitary construction embodying a refrigerant cooling and circulating system, structure for permitting the placing of food containers in contact with the circulating refrigerant, and mechanism for moving the containers through the refrigerant and removing the same therefrom.

Other objects and advantages of the invention will appear from the following description of the same taken in conjunction with the annexed drawings.

The invention comprises, briefly stated, a refrigerant cooling and circulating system combined with an open receptacle through which the refrigerant is adapted to flow and food container conveying mechanism, by which containers are loaded into the receptacle in contact with refrigerant, propelled through the refrigerant and raised out of the same for further processing after freezing.

In the drawings:

Figure 4 is a perspective view looking at the open receptacle of the food freezing apparatus, showing the structure of the refrigerant receptacle and the conveyor mechanism, and how the various parts of the same are constructed, assembled and operated;

Figure 5 is an enlarged fragmentary view of one of the bearings for the shafts supporting the sprockets by which the driving chains are operated, which move the conveyor mechanism;

Figure 6 is a perspective view of one of the pivot brackets of the conveyor mechanism which engage the food containers to propel the same through the refrigerant container, and Figure 7 is an enlarged fragmentary side view of one form of driving mechanism, showing how the same is associated with the conveyor mechanism for operating the same.

Figure 1:
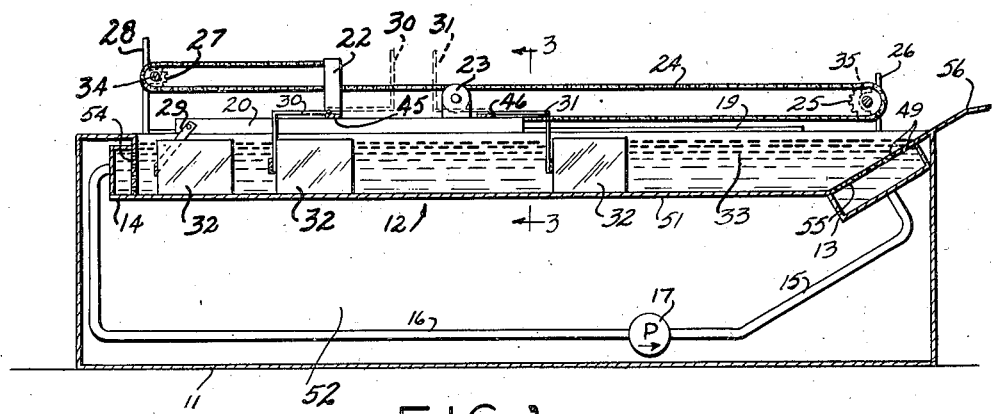
Figure 1 is a side view of the invention, partly in section and partly diagrammatic, illustrating the general relationship between the various parts of the same and the manner in which the container propelling mechanism moves the food containers through the refrigerant.

Referring in greater detail to the drawings, wherein the same parts are designated by the same numerals throughout the several figures, 11 indicates the outer casing structure of the food freezing apparatus, which encloses a refrigerant cooling and circulating system, and supports the mechanism for moving food containers through a liquid refrigerant to freeze the food in the containers. A liquid refrigerant receptacle, indicated generally by the numeral 12, is built into the top portion of the casing 11. This receptacle takes the form of an upwardly open trough having its bottom 51 located at a suitable distance below the top of the casing, and sides 52 and 53 extending vertically upwardly from the bottom 51 in parallel spaced relation to the sides of the casing. One end 54 of the receptacle 12 extends vertically in spaced relation to an end of the casing, and the other end 55 of the receptacle slopes at an angle to the bottom 51 and joins the top edge of the adjacent end of the casing. The ends of the receptacle 12 are perforated as indicated at 49 and 50 to permit liquid refrigerant 33 pumped in at one end to flow through the receptacle and out at the opposite end.

A rectangular distributing manifold or header 14 receives liquid refrigerant at the end 54 of the receptacle through the openings 50, and a similar header 13 delivers the refrigerant to the receptacle at the sloping end 55 through the openings 49. The openings 49 and 50 are preferably distributed evenly throughout the areas of the end portions 54 and 55 of the receptacle and may be of a size adapted to assure a uniform flow of refrigerant through the receptacle 12.

The entire casing and receptacle arrangement described above is preferably constructed of corrosion resistant metal, such as stainless steel of the 18-8 chrome-nickel type, but any suitable material having the requisite physical characteristics rendering the same adaptable for the purpose can be used.

A refrigerant circulating pipe 16 leads from the header 14 of the receptacle to a refrigerating unit 17, and a similar pipe 15 is provided for conducting the refrigerant from the unit back to the receptacle through the header 13, as will best be seen in Figure 1.

The refrigerating unit 17 is designated by P to indicate that this unit is diagrammatic of the entire source of refrigeration, which may be made up of a standard refrigerating system, such as the type used in domestic ice boxes, employing a refrigerating gas such as sulfur dioxide, anhydrous ammonia, methyl chloride, or Freon-12 consisting largely of difluoro-dichloromethane, and similar refrigerating gases which are compressed by means of a suitable compressor such as a reciprocating pump, eccentric vane pump or the like. In refrigerating systems of this kind the compressed gas passes through coils, which may be cooled by water, to reduce the temperature of the gas below the critical value at that pressure, thus condensing the gas to a liquid. The condensed gas then flows into a suitable reservoir or receptacle, and passes through an expansion valve which is thermostatically controlled, into a suitable expansion chamber equipped with coils surrounded by the brine or other liquid refrigerating medium, such as calcium chloride solution or the like. This brine is pumped through the circuit previously described, comprising the pipes 15 and 16 and the receptacle 12.

The refrigerating medium or brine just referred to may, if desired, be colored with a suitable dye in order to provide a plain indication in the event some of the brine gets into the food during the freezing operation. Thus, when the brine is colored a deep green, contamination of ice cream, or other food being frozen, as a result of splashing or spilling of the brine into the containers as they are moved through the refrigerant receptacle, results in obviously staining the product a greenish color wherever the brine has come in contact with the same. This relieves the operator of the freezing apparatus from the task of tasting the ice cream or other product to determine whether or not any brine has splashed into the food containers.

An inclined extension 18 is provided, forming a continuation of the sloping end 55, and terminating in a flat shelf or platform 56 for the reception of the containers of frozen food after the same have been passed through the refrigerant. The filled food containers, designated at 32, are pushed up the sloping end 55 onto the inclined extension 18 and thence onto the shelf or platform 56 from which operators may readily remove the containers for subsequent treatment or disposal.

The conveyor mechanism by which the food containers are propelled through the liquid refrigerant flowing through the receptacle 12, includes guide tracks 19, 19 mounted on the flanged portions 57 and 58 extending between the upper edges of the sides of the casing 11 and the sides 52 and 53 of the receptacle. 20, 20 are angle irons forming the bottom frame of a rack or reciprocating carriage wrich is movable along the guide tracks 19, 19. This rack is supported on ball bearing roller wheels or castors 21, whose axles are permanently secured to the angle irons 20, 20. Upright columns 22, 22 are mounted at opposite ends of one of a pair of carriers 45 extending across the receptacle 12 and connecting the angle irons 20, 20, and one or more diagonal members or braces 47 are provided to give the frame the desired rigidity.

Driving chains 24, 24 are secured at one end to the tops of the upright columns 22, 22, these chains extending over idler pulleys supported on pillar blocks 23, 23 mounted mediate the ends of the angle irons 20, 20, to prevent excess sagging of the chains. Adjacent the sloping end 55 of the receptacle, a pair of sprockets 25, 25, is mounted on a shaft 35 supported by bearings 36, mounted on uprights 26, and near the end 54 of the receptacle a similar pair of sprockets 27, 27 is mounted on a shaft 34 carried in similar bearings 59, 59 mounted on uprights 28. The shaft 34 has a crank 60 and handle 37 at one end to be used by a workman in manually operating the mechanism.

The driving chains 24, 24 extend over the sprockets 27, 27 and 25, 25 and are attached at 61, 61 to the angle irons 20, 20.

It will be obvious that rotation of the crank 60 through handle 37 turns shaft 34 and therewith sprockets 27, 27 thus moving the chains 24, 24 and rolling the frame or reciprocating carriage along the tracks 19, 19 in either direction. Due to the fact that the chains 24, 24 are attached at both ends to the frame and the central portion is carried by the idler pulleys mounted on the pillar blocks 23, 23, the mechanism can be adjusted to provide a minimum of lost motion and wear, thus increasing the efficiency and ease of operation and durability of the mechanism.

Figure 2:
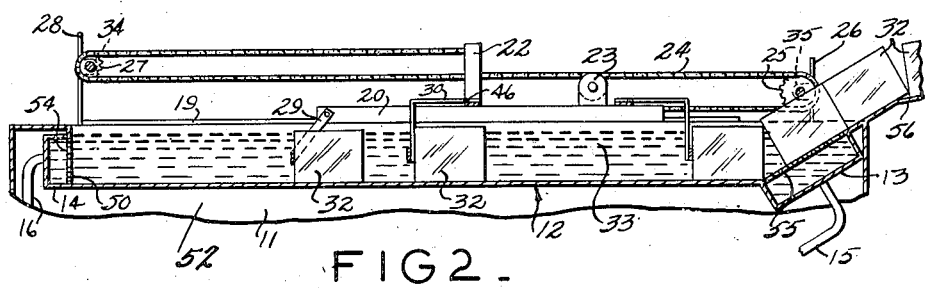
Figure 2 is a fragmentary side view similar to that of Figure 1, further illustrating the manner in which the food containers are propelled through the refrigerant, and how the same are removed therefrom.
Figure 3:
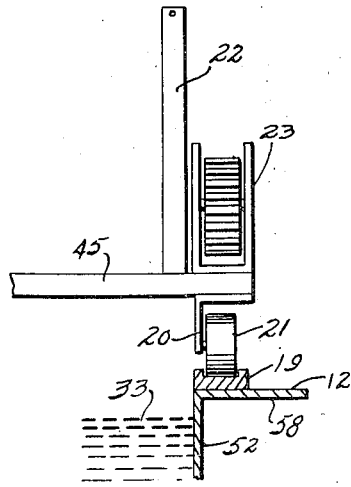
Figure 3 is an enlarged fragmentary view of a portion of the conveyor mechanism showing details of the structure by which the same is supported and operated.

29 is a rectangular bar shaped like a letter "C" and pivoted at each end where it is attached to the frame elements 20, 20. This bar forms a bracket for use in pulling or dragging the containers carrying ice cream or other food to be passed through the refrigerating brine in a direction from left to right of the apparatus as seen in Figures 1, 2 and 4. The object of this bar is to permit the carrier to drag the maximum number of containers or molds through the brine at any one time, and at the same time permit the carrier to propel containers placed in very close proximity to the left hand or starting end of the refrigerant receptacle.

Identical pivoting brackets 30 and 31 are positioned and supported on the carriage in spaced apart relation in such a manner that one of these brackets forms a mirror image of the other. Each of the brackets is constructed as seen in Figure 6, with a top bar 62 and a plurality of downwardly-extending, evenly-spaced L-shaped arms 63, formed at their free ends with hinges 46 for attachment to the carrier members 45 of the movable frame or carriage. The brackets 30 and 31 are as shown in Figure 4, pivoted about the pivot 46ᵃ of the hinge 46 for rotation through 180 degrees so that they can be swung upwardly entirely out of the refrigerant receptacle and resting on top of the frame, or downwardly with the bars 62 extending into the refrigerant, as seen in the dotted line position in Figure 4, for engagement with food containers to be propelled through the refrigerant. Suitable stops may be provided on the carriage to maintain the brackets with the upright portions of the arms 63 exactly vertical when in downward position for best engagement with containers in the refrigerant.

In the extreme position of the carriage approaching the end 54 of the refrigerant receptacle, the pivoted bracket 30 is not close enough to engage a row of containers placed in very close proximity to the end 54, and for this reason the bar 29 is provided to engage the last installed row of food containing receptacles and propel the same through the refrigerant. In a subsequent movement of the mechanism the containers are then engaged by the pivoting brackets 30 and 31.

In Figure 7 a secondary sprocket and chain driving mechanism is delineated, which provides an increase or decrease in the gear ratio as the conditions may require, and also provides a cranking mechanism positioned directly over the starting end of the refrigerant receptacle away from the movable carriage. The secondary sprocket and chain driving mechanism may be mounted in a suitable housing 41 secured to the top of the casing 11, and comprises a sprocket 64 mounted on shaft 34 over which a drive chain 44 operates, and which is driven by the sprocket 43. The sprocket 43 may have one or more cone pulleys 65 mounted with it on the same axle, for cooperation with a V-belt 66 passing over duplicate cone pulleys 39 on shaft 40 rotated by an adjustable crank 38. The crank 38 may be adjustable in length to change its radius of rotation. Further, a motor equipped with worm or other gear reducing system terminating in a line shaft may be provided for driving another cone pulley to operate the secondary driving mechanism.

To operate the above described food freezing apparatus, the movable carriage is first moved toward the end 54 of the liquid refrigerant receptacle 12 as far as it will go, and filled food containers, indicated by 32 in Figures 1 and 2, are placed in the refrigerant 33 in close proximity to the end 54. In this condition of the apparatus the bar 29 occupies a downwardly extending position between the end 54 and the adjacent row of containers, as best seen in Figure 1.

Forward movement of the carriage toward the end 55 of the refrigerant receptacle drags the row of containers along the bottom of the receptacle from left to right as seen in Figure 1, the rate of movement being controlled by the operation of the crank 60 or in the alternative, by the rate at which the driving mechanism shown in Figure 7 is operated.

When the carriage has reached its extreme forward position toward the sloping end 55, it is returned to the starting position, the pivoting brackets 30 and 31 being raised, as seen in the solid lines in Figure 4 to clear the containers 32, and another row of containers is lowered into the refrigerant in close proximity to the end wall 54. The pivoting brackets 30 and 31 are then lowered to the position indicated in dotted lines in Figure 4, and in solid lines in Figures 1 and 2, and the carriage again moved forward. The previously mentioned row of containers is engaged by the bracket 30 and moved forward at the same time the next row of containers is dragged forward by the bar 29. Upon reaching its forwardmost position the brackets 30 and 31 are again raised, the carriage returned to its rearmost position and the preceding operation repeated with an additional row of food containers placed in the refrigerator proximate the end wall 54. By repeating the foregoing operations a continuous series of food containers can be propelled through the refrigerant receptacle, and upon reaching the sloping end 55 the foremost containers will be pushed up the slope by the movement of succeeding rows as the operation of the apparatus progresses, thus forcing each row up the sloping end 55 and up the inclined extension 18 onto the platform 56 from whence the containers of now completely frozen food are removed for further processing.

It will be seen that the bar 29 forms a means for engaging each successive row of containers as the same are inserted in the receptacle 12, and this bar together with the pivoting brackets 30 and 31 provide means for engaging the rows of containers to move the same by successive stages through the refrigerant and out of the receptacle by way of the sloping end 55, thus making it possible to operate the apparatus continuously. Furthermore, as the carriage is returned to the starting position each time, the bar 29 can be raised, as seen in the dotted lines in Figure 1 to permit the same to pass over a row of containers placed in the refrigerant adjacent the end 54, and the bar can then be lowered to engage these containers, thus making it possible to insert a row of containers while the next succeeding row is being moved forward without waiting for the carriage to be returned from the succeeding movement.

It will thus be seen that the invention as above described provides a food freezing apparatus of rugged construction and simple design, capable of continuous operation and adaptable for use under any desired conditions of refrigeration.

While the invention has been described by reference to a particular embodiment of the same, it will, of course, be understood that many modifications in the various parts and changes in the arrangement of the same can be made within the scope of the appended claims and without departing from the spirit of the invention.

Having thus clearly shown and described the invention, what is claimed and desired to secure by Letters Patent is:

1. In a food freezing machine a refrigerant receptacle having inlet and exit ends, a refrigerant cooling and circulating system associated with said receptacle for supplying liquid refrigerant thereto, mechanism for moving containers through refrigerant in said receptacle, said mechanism including a reciprocating carriage supported above said receptacle, means depending from said carriage for engagement with containers occupying successive positions in said receptacle when said carriage is moved in one direction, said means being movable to positions to pass over said containers when said carriage is moved in the other direction, and means at the exit end of said receptacle for expediting the removal of said containers from said refrigerant.

2. In a food freezing machine a refrigerant receptacle having inlet and exit ends, a refrigerant cooling and circulating system associated with said receptacle, mechanism for moving containers through refrigerant in said receptacle, said mechanism including a reciprocating carriage supported above said receptacle, means depending from said carriage for engagement with containers occupying successive positions throughout the length of said receptacle when said carriage is moved in one direction, said means being movable to positions to pass over said containers when said carriage is moved in the other direction, and a sloping end on said receptacle for expediting the removal of said containers from the refrigerant.

3. In a food freezing machine a refrigerant receptacle having inlet and exit ends, a refrigerant cooling and circulating system associated with said receptacle, mechanism for moving containers by successive stages through refrigerant in said receptacle, said mechanism including a reciprocating carriage supported above said receptacle, means depending from said carriage for engagement with containers occupying successive positions in said receptacle when said carriage is moved in one direction, said means being movable to positions permitting the same to pass over said containers when moved in the opposite direction, and means at the exit end of said receptacle for engagement with the bottoms of said containers as the same are moved successively over said means, said movement over said means removing the containers from the refrigerant.

4. In a food freezing machine a refrigerant receptacle, a refrigerant cooling and circulating system associated with said receptacle, mechanism for moving containers by successive stages through refrigerant in said receptacle, said mechanism including a reciprocating carriage supported above said receptacle, a carrier extending transversely of the carriage, and a bracket pivotally supported on said carrier, said bracket in one position engaging containers in said receptacle and in another position resting on said carriage above said receptacle.

5. In a food freezing machine a refrigerant receptacle, a refrigerant cooling and circulating system associated with said receptacle, mechanism for moving containers by successive stages through refrigerant in said receptacle, said mechanism including a reciprocating carriage supported above said receptacle, and means depending from said carriage for engagement with containers in said receptacle when said carriage is moved in one direction and adapted to occupy positions above said carriage to clear said containers when said carriage is moved in the other direction, said means including L-shaped arms pivotally connected to said carriage.

6. In a food freezing machine a refrigerant receptacle, a refrigerant cooling and circulating system associated with said receptacle, mechanism for moving containers by successive stages through refrigerant in said receptacle, said mechanism including a reciprocating carriage supported above said receptacle, said carriage having a bar extending transversely thereof, and variable container-engaging means pivoted to the bar of said carriage, said means being adapted in one position to extend below said carriage for engagement with said containers when said carriage is moved in one direction, and in another position to extend above said carriage clear of said containers when said carriage is moved in the opposite direction.

7. In a food freezing machine a refrigerant receptacle, a refrigerant cooling and circulating system associated with said receptacle, mechanism for moving containers by successive stages through refrigerant in said receptacle, said mechanism including a reciprocating carriage supported above said receptacle, said carriage having a bar extending transversely thereof, and movable container-engaging means on said carriage adapted in one position to engage said containers when said carriage is moved in one direction, and in another position to pass over said containers when said carriage is moved in the opposite direction, said means including a series of separately spaced arms pivotally connected to the bar of said carriage.

8. In a food freezing machine a refrigerant receptacle, a refrigerant cooling and circulating system associated with said receptacle, mechanism for moving containers by successive stages through refrigerant in said receptacle, said mechanism including a reciprocating carriage supported above said receptacle, said carriage having a bar extending transversely thereof, and means pivoted to said carriage adapted in one position to extend below said carriage for engagement with said containers when said carriage is moved in one direction, and in another position to extend above said carriage clear of said containers when said carriage is moved in the opposite direction, said means comprising a series of L-shaped arms pivoted to the transversely extending bar, and a second bar connecting the free ends of the L-shaped arms.

9. In a food freezing machine, a refrigerant receptacle having inlet and exit ends, a refrigerating cooling and circulating system associated with said receptacle, a reciprocating carriage supported above said receptacle, end container-engaging means movable with and pivotally mounted on said carriage adjacent the inlet end of the receptacle for engaging containers introduced into the receptacle near the inlet end of the receptacle, and a second container-engaging means positioned forwardly of said end container-engaging means, said second container-engaging means being supported above said receptacle and depending from and movable with said carriage for engagement with containers when said carriage is moved in one direction, said second container-engaging means being movable to a position permitting the same to pass over said containers when moved in an opposite direction.

10. In a food freezing machine, a refrigerant receptacle having inlet and exit ends, a refrigerating cooling and circulating system associated with said receptacle, a reciprocating carriage supported above said receptacle, end container-engaging means movable with and pivotably mounted on said carriage adjacent the inlet end of the receptacle for engaging containers introduced into the receptacle near the inlet end of the receptacle, and a second container-engaging means positioned forwardly of said end container-engaging means, said second container-engaging means being supported above said receptacle, said second container-engaging means including a carrier member extending transversely of the carriage and a container-holding member pivotably supported on the transverse carrier, said second container-engaging means being movable with and depending from said carriage for engagement with containers occupying successive positions in said receptacles when said carriage is moved in one direction, said second container-engaging means being movable to a position permitting the same to pass over said containers when moved in an opposite direction.

11. In a food freezing machine, a refrigerant receptacle having inlet and exit ends, a refrigerating cooling and circulating system associated with said receptacle, a reciprocating carriage supported above said receptacle, end container-engaging means movable with and pivotally mounted on said carriage adjacent the inlet end of the receptacle for engaging containers introduced into the receptacle near the inlet end of the receptacle, and a second container-engaging means positioned forwardly of said end container-engaging means, the latter being supported above said receptacle and movable with and pivotably mounted with respect to said carriage, said second container-engaging means depending from said carriage for engagement with containers when the carriage is moved in one direction, and adapted in another position to extend above said carriage clear of said containers when the carriage is moved in the opposite direction.

12. In a food freezing machine, a refrigerant receptacle having inlet and exit ends, a refrigerating cooling and circulating system associated with said receptacle, a reciprocating carriage supported above said receptacle, end container-engaging means being movable with and pivotably mounted on said carriage adjacent the inlet end of the receptacle for engaging containers introduced into the receptacle near the inlet end of the receptacle, and a second container-engaging means positioned forwardly of said end container-engaging means, the latter being supported above said receptacle, said second container-engaging means including a carrier member extending transversely of the carriage and a container-holding member pivotably supported on the transverse carrier, said second container-engaging means being movable with and depending from said carriage for engagement with containers when the carriage is moved in one direction and adapted in another position to extend above said carriage clear of said containers when the carriage is moved in the opposite direction.

13. In a food freezing machine, a refrigerant receptacle having inlet and exit ends, a refrigerating cooling and circulating system associated with said receptacle, a reciprocating carriage supported above said receptacle, end container-engaging means being movable with and pivotably mounted on said carriage adjacent the inlet end of the receptacle for engaging containers introduced into the receptacle near the inlet end of the receptacle, and a second container-engaging means positioned forwardly of said end container-engaging means, the latter being supported above said receptacle, said second container-engaging means including a carrier member extending transversely of the carriage and a container-holding member pivotably supported on the transverse carrier, said second container-engaging means being movable with and depending from said carriage for engagement with containers when the carriage is moved in one direction and adapted in another position to extend above said carriage clear of said containers when the carriage is moved in the opposite direction, said container-holding member comprising a series of separately spaced arms enabling the refrigerant to directly contact the containers between said spaced arms.

14. In a food freezing machine, a refrigerant receptacle having inlet and exit ends, a refrigerating cooling and circulating system associated with said receptacle, mechanism for moving containers by successive stages through the refrigerant in said receptacle, said mechanism including a reciprocating carriage supported above said receptacle, a carrier extending transversely of the carriage, a container-holding member pivotably supported on said carrier and movable with said carriage, said container-holding member in one position engaging a row of containers in said receptacle and in another position resting on said carriage above said receptacle.

15. In a food freezing machine, a refrigerant receptacle having inlet and exit ends, a refrigerating cooling and circulating system associated with said receptacle, a reciprocating carriage supported above said receptacle, container-engaging means supported above said receptacle, said means including a carrier member extending transversely of the carriage and a container-holding member pivotably supported on the carriage, said container-engaging means being movable with and depending from said carrier for engagement with containers when the carriage is moved in one direction and adapted in another position to extend above said carriage clear of said containers when the carriage is moved in the opposite direction.

KOSMAS EFTIHIOS.

REFERENCES CITED

The following references are of record in the file of this patent:

UNITED STATES PATENTS

| Number | Name | Date |
|---|---|---|
| 1,530,108 | Collins | Mar. 17, 1925 |
| 1,605,537 | Gay | Nov. 2, 1926 |
| 1,627,391 | House | May 3, 1927 |
| 1,987,170 | Varney | Jan. 8, 1935 |
| 2,418,746 | Bartlett et al. | Apr. 8, 1947 |